(12) United States Patent
Walker et al.

(10) Patent No.: US 7,965,051 B1
(45) Date of Patent: Jun. 21, 2011

(54) SYSTEM AND METHOD FOR A USER-SELECTABLE TINTED WINDOW PANEL APPARATUS

(76) Inventors: Wayne Walker, Bossier City, LA (US);
Earnie Lee Walker, Missouri City, TX (US)

( * ) Notice: Subject to any disclaimer, the term of this patent is extended or adjusted under 35 U.S.C. 154(b) by 889 days.

(21) Appl. No.: 11/827,607

(22) Filed: Nov. 13, 2007

(51) Int. Cl.
*H02P 1/54* (2006.01)
*B60J 7/057* (2006.01)

(52) U.S. Cl. .......... 318/53; 318/626; 318/671; 296/223; 296/97.9; 296/100.05; 296/97.4

(58) Field of Classification Search ............ 318/34, 318/38, 45, 51, 53, 115, 135, 626, 671; 296/89, 296/97.4, 97.9, 97.11, 97.12, 97.13, 100.03, 296/100.05, 216.04, 223; 160/370, 370.21, 160/370.22, 370.23
See application file for complete search history.

(56) References Cited

U.S. PATENT DOCUMENTS

| | | | | |
|---|---|---|---|---|
| 4,195,680 A * | 4/1980 | Hyman et al. | ............. | 160/166.1 |
| 5,653,278 A * | 8/1997 | Cheng | ....................... | 160/370.22 |
| 6,086,133 A * | 7/2000 | Alonso | ........................ | 296/97.8 |
| 6,520,239 B2 * | 2/2003 | Schlecht et al. | ............. | 160/120 |
| 6,682,133 B2 * | 1/2004 | Glasl | ........................ | 296/216.01 |
| 2006/0082192 A1 * | 4/2006 | Dubay et al. | .................. | 296/214 |

\* cited by examiner

*Primary Examiner* — Walter Benson
*Assistant Examiner* — Thai Dinh
(74) *Attorney, Agent, or Firm* — Kevin D. Jablonski; Graybeal Jackson LLP

(57) ABSTRACT

A user selectable optional power tinting system. A typical OPTS includes a user selection interface operable to allow a user to select a tinting option from a plurality of tinting options, a panel selection assembly coupled to the user selection interface and operable to engage a window panel corresponding to an option selected by the user selection interface, an actuator motor operable to engage the panel selection assembly when an option is selected from the user selection interface, and a plurality of differently tinted panels operable to be engaged by the panel selection assembly when an option is selected from the user selection interface, each differently tinted panel corresponding to one of the plurality of tinting options.

20 Claims, 3 Drawing Sheets

SYSTEM AND METHOD FOR A USER-SELECTABLE TINTED WINDOW PANEL APPARATUS

BACKGROUND OF THE INVENTION

Window tinting, sometimes also called window film, is typically a transparent plastic film or metallic laminate which is applied directly to glass windows. It is typically available in many different compositions. Further, varying effects on the optical and mechanical properties of the underlying glass are, also available. Most often, window tinting is applied to finished glass which is easier to install and less costly than chemically altered specialty glass. Applying various forms of window tinting to the glass windows in automobiles is a popular option on many vehicles.

The colorful film on these windows gives the vehicle a unique appearance while providing privacy and protection from the ultra-violet waves and the like. Heat rejection films are normally applied to the interior of flat glass windows to reduce the amount of infrared visible light, and UV radiation entering windows. Such films are either dyed or metalized (which can be transparent to visible light) to convert incoming solar radiation to infrared radiation, which is then rejected back through the glass to the exterior. Privacy films for automobiles are available in gradients of darkness, with the darker tints commonly known as "limo tint".

Amongst the benefits of tinting windows in a vehicles (e.g., privacy, protection from sunlight), specific drawbacks exists that are unique to a vehicle. Due to its very nature, window tinting often reduces visibility through the vehicle's windows. This can be problematic at night, when motorists must be able to see through the windows of other vehicles in order to spot hazards which would otherwise be obstructed. Police officers also want to be able to identify the passengers in a vehicle. As a result, in many jurisdictions, there are laws to ensure darkness of films do not present a danger to motorists.

For example, in the United States, the federal Department of Transportation (DOT) specifies a minimum of 70% visible light transmission (VLT) for window tinting on the windshield and the windows to the immediate left and right of the driver for all commercial vehicles. The DoT does not specify any VLT requirements for any other windows, however, individual states can pass laws that go further than the requirements set forth by the DoT. Thus, in some jurisdictions, commercial vehicles may not have any window tinting. Just the opposite though, private vehicles may have tint on the windows to the immediate left and right of the driver as dark as 20% VLT, depending on the state.

With any number of variances across jurisdictions as well as variances in level of sunlight or desired privacy, choosing a single level of window tinting for each window in a vehicles limits the versatility of such a window tinting system. That is, one may wish to have a vehicle with little or no window tinting while driving at night yet have the same vehicle with a high level of window tinting for daytime driving when the sun is prevalent. What is needed is a system that allows options for various level of tinting on each window in a vehicle.

BRIEF DESCRIPTION OF THE DRAWINGS

The foregoing aspects and many of the attendant advantages of the claims will become more readily appreciated as the same become better understood by reference to the following detailed description, when taken in conjunction with the accompanying drawings, wherein:

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

Figure 1:
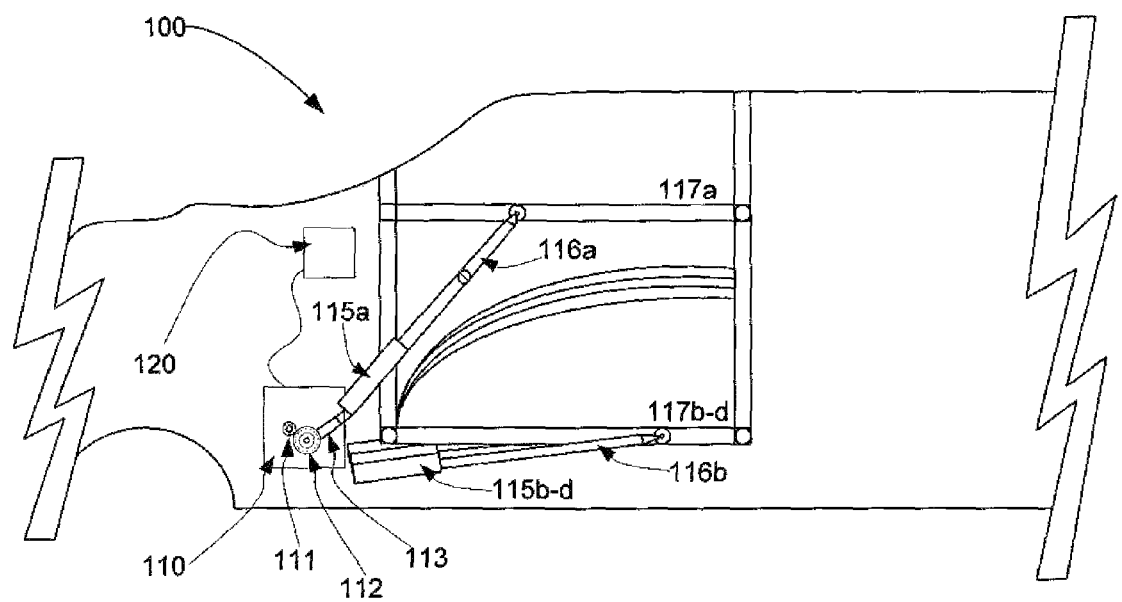
FIG. 1 shows a cutaway side view of a vehicle having an optional power tinting system according to an embodiment of an invention disclosed herein.

FIG. 1 shows a cutaway side view of a vehicle having an optional power tinting system (OPTS) 100 according to an embodiment of an invention disclosed herein. In this depiction, one can see a various assemblies and mechanisms of an OPTS 100 typically housed within a door of a vehicle. In this example, the driver's side front window is shown, but it will be understood by those in the art that the OPTS 100 may be deployed for any window in any vehicle. Furthermore, the OPTS 100 is not limited to vehicles as building with windows may also have an OPTS 100 deployed for use. For brevity, only the vehicle aspects of a vehicle-related OPTS 100 are discussed herein.

By way of overview, a typical OPTS 100 includes a user selection interface 120 operable to allow a user to select a tinting option from a plurality of tinting options, a panel selection assembly 110 coupled to the user selection interface 120 and operable to engage a window panel 117a-d corresponding to an option selected by the user selection interface 120, an actuator motor operable to engage the panel selection assembly 110 when an option is selected from the user selection interface 120, and a plurality of differently tinted panels 117a-d operable to be engaged by the panel selection assembly when an option is selected from the user selection interface, each differently tinted panel corresponding to one of the plurality of tinting options. Each of these aspects is described in more detail in the following paragraphs.

The OPTS 100 typically controlled by the user selection interface 120 that is mounted in an accessible location within the vehicle. For example, the user selection interface 120 may be mounted on the dashboard of the vehicle easily within reach of a driver. Other locations are contemplated, such as for passengers seated in rear seats and the like. The user selection interface 120 is described in greater detail below with respect to FIG. 2.

The user selection interface 120 is electronically coupled to the panel selection assembly 110. The panel selection assembly 110 is a mechanism that controls the selection of one of a plurality of tinted panels 117a-d that are mounted congruent to the specific window in which they correspond.

the panel selection assembly 110 further comprises a small gear 111 coupled to an actuator motor (not shown in FIG. 1), a large gear 112 engaged with the small gear 111, a short arm 113 coupled to the large gear 112 and having multiple prongs, and a long arm 115a-d operable to be engaged by at least one prong on the short arm 113. Each prong corresponds to a specific selection of window such that when a tinting option is selected the corresponding prong on the short arm 113 engages a corresponding long arm for the tinting option.

In the system 100, each long arm 115a-d corresponds uniquely with each of the tinted panels 117a-d. Furthermore, each long arm 115a-d also includes a tensioner arm 118a that is used to maintain lateral pressure of the tinted panel 117a-d to the window panel. This tension mechanism is shown in more detail with respect to FIG. 4 below.

Each of the tinted panels 117a-d comprises a different tinting level such that a user may select a variety of different tinting when choosing to engage the system 100. By way of example, the tinting options available include a panel having a 70% light passage rating that may typically correspond to a UV rating tinting option. As another example, the tinting options available include a panel having a 30% light passage rating that may typically correspond to a limousine tinting level. As yet another example, the tinting options available include a panel having a 100% light passage rating that may typically correspond to a clear tinting level. Such a clear to a level may include other properties such as UV protection and the like. Finally, another example, the tinting options available include a panel having a 0% light passage rating that may typically correspond to an opaque tinting level for complete privacy. It is well understood that any variety of tinted panels any be used with the OPTS 100 and the percentage of light transmission described herein, is not a limiting disclosure.

Each of the tinted panels 117a-d may typically comprises a flexible material such as fiberglass, Plexiglas, plastic, composite plastic, and tempered glass. As a tinted panel is engaged, the flexible nature of tinted panel allows for the leading edge of the tinted panel to slide smoothly along the corresponding window as is raised or lowered. In this manner, the engaged tinted panel is deployed adjacent to the existing car window. Furthermore, the tinted panels are angled at a non-zero angle to the window in an effort to create further tensions to maintain adjacency and typically engaged on the inside of the vehicle, i.e., inside of the window. Because of this angle to the vehicle window, each tinted panels may emerge when raised and returned when lowered from a single adjacent opening near the vehicle window.

Although shown in FIG. 1 as the driver side front window, the system of FIG. 1 may be adapted to be used on all vehicle windows. That is, every other typical window in any common vehicle may have the package implemented therein.

Figure 2:
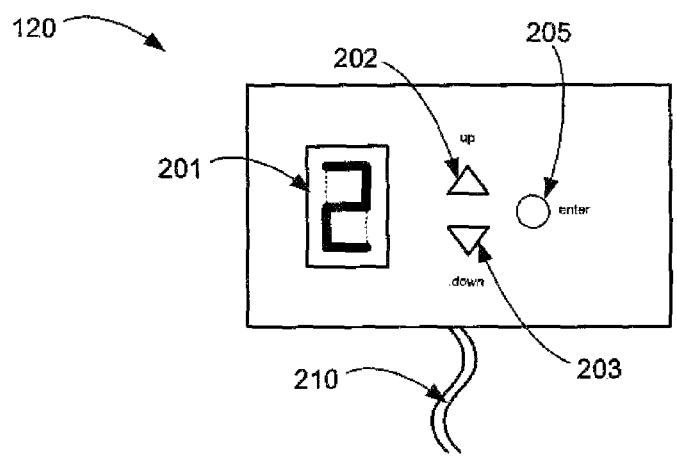
FIG. 2 shows a control panel typically installed in a vehicle having an optional power tinting system according to an embodiment of an invention disclosed herein.

FIG. 2 shows a control panel typically installed in a vehicle having an optional power tinting system according to an embodiment of an invention disclosed herein. The control panel or user selection interface 120 typically includes a display 201 for showing the specific selection the user has entered. This selection corresponds to one of the plurality of tinting options available, e.g., one of the tinted panels 117a-d. The user selection interface 120 further includes push buttons for up 202 and 203. These push buttons may be actuated to move the display selection up or down which in turn corresponds to a different selection amongst the plurality of tinting panels 117a-d. When a desired selection is displayed, a user may actually an 'enter' pushbutton 205 to engage the selection. The OPTS 100 then implements the user's selection.

Figure 3:
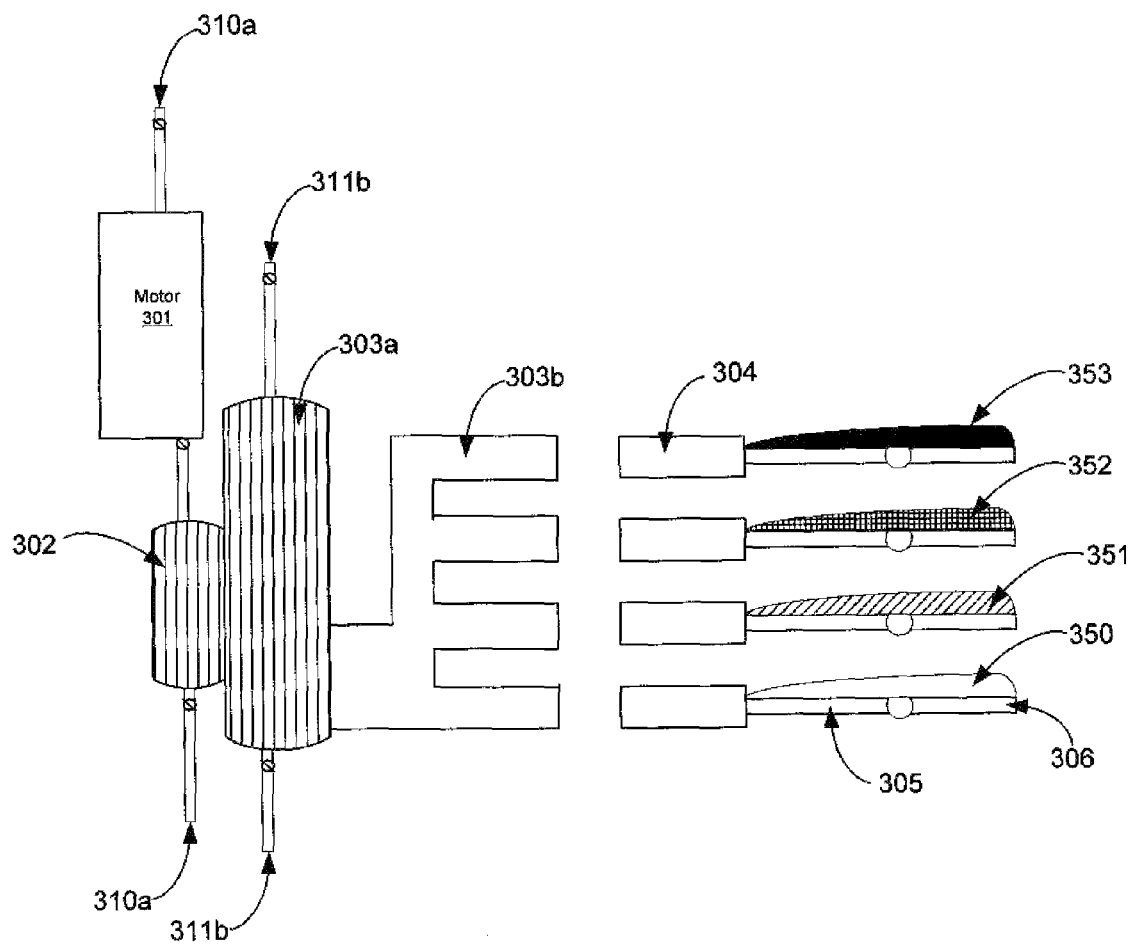
FIG. 3 shows a plan view of an optional power tinting system according to an embodiment of an invention disclosed herein.

FIG. 3 shows a plan view of an optional power tinting system 100 according to an embodiment of an invention disclosed herein. Several aspects of the panel selection assembly 110 are shown here. An actuator motor 301 is controlled by the user selection interface 120 (not shown in FIG. 3) a couple directly to the small gear 302. The actuator motor 301 and a small gear 302 are typically coupled to the vehicle at anchor points 310a and 310b. The small gear is engaged with the large gear 303a to create a larger mechanical advantage when rotating the prongs 303b of the small arm. The large gear 303a is coupled to the vehicle at anchor points 311a and 311b. As such, when engaged, one of the prongs 303b of the small arms will engage one of the long arms 304 of a corresponding selected tinted panel 350-353. As discussed previously, each long arm 304 includes a tensioner arm 305 for maintaining lateral torque against the engaged window.

The OPTS 100 further comprising an arresting mechanism 306 operable to detect the vertical position of a corresponding, vehicle window and disengage the actuator motor 310a when an engaged tinting panel 350-354 reaches an equivalent vertical position. The arresting mechanism may be a torque sensing device coupled to the actuator motor 301 or a position sensing proximity switch coupled to the actuator motor 301.

Figure 4:
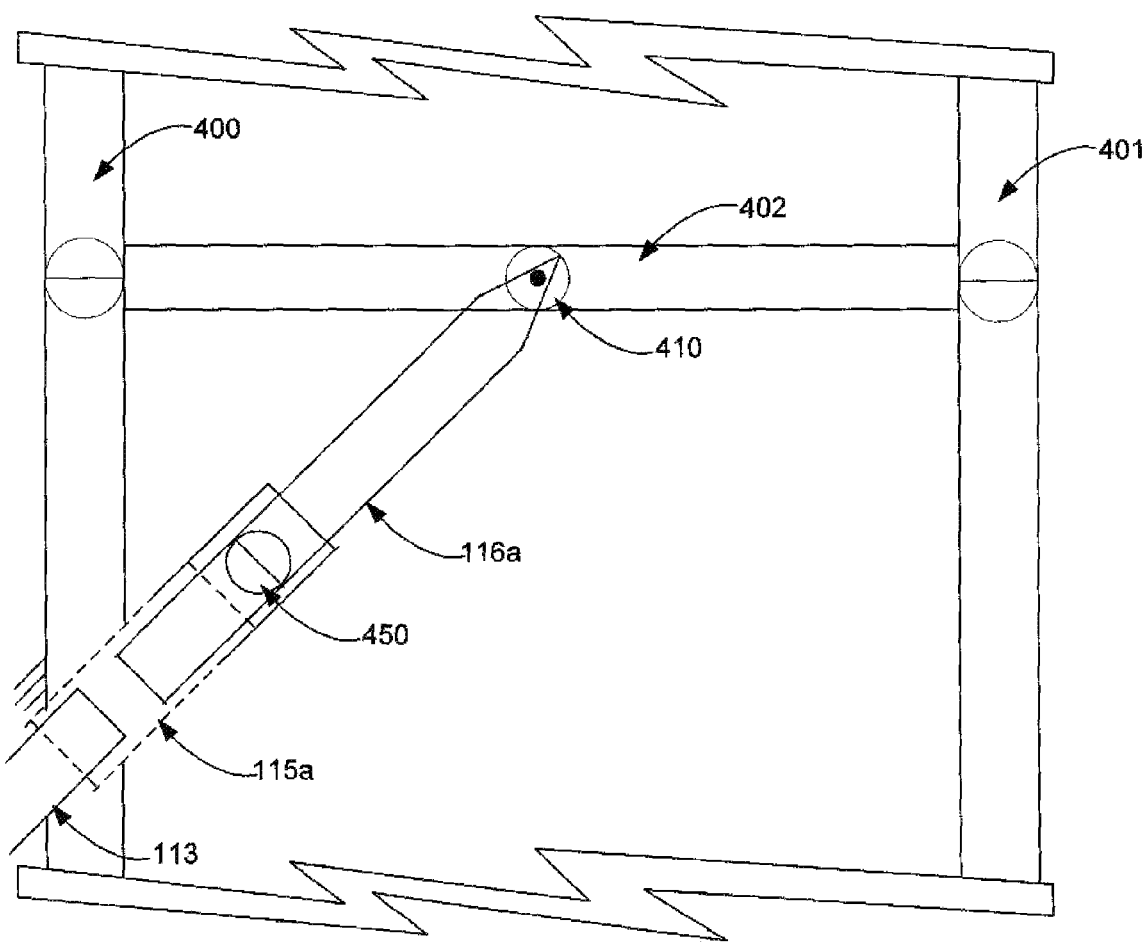
FIG. 4 shows a cutaway view of a rail guide for a tinting panel within a vehicle having an optional power tinting system according to an embodiment of an invention disclosed herein.

FIG. 4 shows a cutaway view of a rail guide for a tinting panel within a vehicle having an optional power tinting system according to an embodiment of an invention disclosed herein. As a tinted panel is maneuvered into place, rail guides 400 and 401 maintain verticality of the tinted panel. A roller engagement 410 allows the long arm 116a to push or pull the tinted panel up or down by laterally moving back and forth on a horizontal guide rail 402. This mechanism provides the translation of rotational motion from the actuator motor and panel selection assembly to vertical motion of the tinted panel. The long arm further comprises a tension joint 450 operable to apply a lateral force on the tinting panel such that constant pressure is applied to a corresponding window when a tinting panel is engaged.

The tinted panels are arranged side-by-side when stored and utilize the same guide rail system when one amongst them is engaged. When a new selection is to be engaged, the currently deployed tinted panel is lowered and stored and a new tinted panel is engaged and, raised.

Such a OPTS 100 is beneficial as an operator of the vehicle may select an optimal tinting panel for the situation. That is, the driver may have a high level of tint for driving on a sunny day, no tint for a dark night or opaque tint when parked. Other benefits includes protection for passengers in the rear, protection from harmful Ultra Violet (UV) rays, more effective and practical than stick-on blinds, essential cooling for pets greater privacy, reduces visibility of valuables, reduces glare and reflection on LCD screens and can offer protection for those suffering from extreme photo-sensitive conditions or skin sensitivity.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A user-selectable window panel tinting system, comprising:
   a user selection interface operable to allow a user to select a tinting option from a plurality of tinting options;
   a panel selection assembly coupled to the user selection interface and operable to engage a window panel corresponding to an option selected by the user selection interface;

an actuator motor operable to engage the panel selection assembly when an option is selected from the user selection interface; and a plurality of differently tinted panels operable to be engaged by the panel selection assembly when an option is selected from the user selection interface, each differently tinted panel corresponding to one of the plurality of tinting options.

2. The system of claim 1 wherein one of the plurality of tinting options comprises a panel having a 70% light passage rating.

3. The system of claim 1 wherein one of the plurality of tinting options comprises a panel having a 30% light passage rating.

4. The system of claim 1 wherein one of the plurality of tinting options comprises a panel having a 100% light passage rating.

5. The system of claim 1 wherein one of the plurality of tinting options comprises a panel having a 0% light passage rating.

6. The system of claim 1 wherein each of the panels comprises a material selected from one of the group including: fiberglass, Plexiglas, plastic, composite plastic, and tempered glass.

7. The system of claim 1 wherein the panel selection assembly further comprises:
   a small gear coupled to the actuator motor;
   a large gear engaged with the small gear
   a short arm coupled to the large gear and having multiple prongs, each prong corresponding to a different tinting panel option; and
   a long arm operable to be engaged by at least one prong on the short arm such that when a tinting option is selected, a corresponding prong on the short arm engages a corresponding long arm for the tinting option.

8. The system of claim 7 wherein the long arm further comprises a tension joint operable to apply a lateral force on the tinting panel such that constant pressure is applied to a corresponding window when a tinting panel is engaged.

9. The system of claim 7 further comprising guide rails for maintaining an even position of the tinting panel with respect to a corresponding vehicle window.

10. The system of claim 1 further comprising an arresting mechanism operable to detect the vertical position of a corresponding vehicle window and disengage the actuator motor when an engaged tinting panel reaches an equivalent vertical position.

11. The system of claim 10 wherein the arresting mechanism comprises a torque sensing device coupled to the actuator motor.

12. The system of claim 10 wherein the arresting mechanism comprises a position sensing proximity switch coupled to the actuator motor.

13. A vehicle having a user selectable window tinting system, the vehicle comprising:
   a plurality of vehicle windows including at least a driver side front window and a passenger side front window;
   a window tinting user selection interface operable to allow a user to select a tinting option from a plurality of tinting options for each window in the vehicle; and
   an optional power tinting system operable to be controlled by the user selection interface, the optional power tinting, system comprising:
      a panel selection assembly coupled to the user selection interface and operable to engage a window panel corresponding to an option selected by the user selection interface;
      an actuator motor operable to engage the panel selection assembly when an option is selected from the user selection interface; and
      a plurality of differently tinted panels operable to be engaged by the panel selection assembly when an option is selected from the user selection interface, each differently tinted panel corresponding to one of the plurality of tinting options.

14. The vehicle of claim 13 wherein the windshield of the vehicle is excluded from the windows that are operable to be engaged by the optional power tinting system.

15. The vehicle of claim 13 wherein the rear window of the vehicle is excluded from the windows that are operable to be engaged by the optional power tinting system.

16. The vehicle of claim 13 wherein a first window may be engaged with a panel selected as a first option and a second window may be engaged with a panel selected as a second option, such that two different windows are engaged with a different tinting option simultaneously.

17. The vehicle of claim 13 wherein an option comprising a 100% light rejection selection may not be engaged while the vehicle is in operation.

18. The vehicle of claim 13 wherein each of the panels comprises a material selected from one of the group including: fiberglass, Plexiglas, plastic, composite plastic, and tempered glass.

19. The vehicle of claim 13 wherein each of the panels comprises a different level of tinting selected from one of the group including clear, limousine, opaque, UV-rated, semi-transparent, and semi-opaque.

20. The vehicle of claim 13 further comprising a second user interface panel operable to control the optional power tinting system from a second location in the vehicle.

* * * * *